(12) United States Patent
Mitchell et al.

(10) Patent No.: US 7,430,332 B2
(45) Date of Patent: Sep. 30, 2008

(54) APPROXIMATIONS USED IN PERFORMANCE SENSITIVE TRANSFORMATIONS WHICH CONTAIN SUB-TRANSFORMS

(75) Inventors: Joan LaVerne Mitchell, Longmont, CO (US); Arianne Therese Hinds, Boulder, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 658 days.

(21) Appl. No.: 11/041,563

(22) Filed: Jan. 24, 2005

(65) Prior Publication Data

US 2006/0078213 A1 Apr. 13, 2006

Related U.S. Application Data

(60) Provisional application No. 60/616,689, filed on Oct. 7, 2004.

(51) Int. Cl.
*G06K 9/46* (2006.01)
(52) U.S. Cl. .................. 382/248; 382/232; 382/250
(58) Field of Classification Search .......... 382/248, 382/250, 232; 708/402
See application file for complete search history.

(56) References Cited

U.S. PATENT DOCUMENTS 5,285,402 A * 2/1994 Keith ................. 708/402

FOREIGN PATENT DOCUMENTS

JP 02001265014 A * 9/2001

* cited by examiner

*Primary Examiner*—Anh Hong Do
(74) *Attorney, Agent, or Firm*—Duft Bornsen & Fishman, LLP (57) ABSTRACT

The present invention provides methods, apparatus and articles of manufacture for performing a transform equation in which at least two sub-transform equations can be identified. According to the invention, each sub-transform is considered separately and the constants of each sub-transform are replaced with an approximation which is a function of an integer value and a second value, where the second value is common to each constant in a sub-transform. The transform equation is then performed with the integer values in place of the constants. As a result either the input to the transform equation or at least one of the result of the transform and a value to be compared the result, is modified with a value which is a function of the second values for each sub-transform. By considering each sub-transform separately the second values of each sub-transform can be different thus allowing more accurate approximations to be used with minimal degradation in performance.

25 Claims, 8 Drawing Sheets

Fig. 7

APPROXIMATIONS USED IN PERFORMANCE SENSITIVE TRANSFORMATIONS WHICH CONTAIN SUB-TRANSFORMS

CROSS REFERENCE TO RELATED APPLICATIONS

The present application is related to and claims priority from Provisional Application 60/616,689 filed on Oct. 7, 2004, the content of which in incorporated herein. This application is also related to the following co-pending and commonly-assigned patent applications, which are hereby incorporated herein by reference in their respective entirety:

"Reducing errors in performance sensitive transformations" to Hinds et al., U.S. patent application Ser. No. 10/960,253, filed on Oct. 7, 2004.

"Compensating for errors in performance sensitive transformations" to Hinds et al., having U.S. patent application Ser. No. 10/960,255, filed on Oct. 7, 2004.

BACKGROUND OF THE INVENTION

1. Field of the Invention

This invention relates in general to data processing, and more particularly to improving approximations used in performance sensitive transformations which contain sub-transforms.

2. Description of the Related Art

Transforms, which take data from one domain (e.g., sampled data) to another (e.g., frequency space), are used in many signal and/or image processing applications. Such transforms are used for a variety of applications, including, but not limited to data analysis, feature identification and/or extraction, signal correlation, or data compression. Many of these transforms require efficient implementation for real-time and/or fast execution whether or not compression is used as part of the data processing.

Data compression is desirable in many data handling processes, where too much data is present for practical applications using the data. Commonly, compression is used in communication links, to reduce transmission time or required bandwidth. Similarly, compression is preferred in image storage systems, including digital printers and copiers, where "pages" of a document to be printed may be stored temporarily in memory. Here the amount of media space on which the image data is stored can be substantially reduced with compression. Generally speaking, scanned images, i.e., electronic representations of hard copy documents, are often large, and thus make desirable candidates for compression.

In data processing, data is typically represented as a sampled discrete function. The discrete representation is either made deterministically or statistically. In a deterministic representation, the point properties of the data are considered, whereas, in a statistical representation, the average properties of the data are specified. In particular examples referred to herein, the terms images and image processing will be used. However, those skilled in the art will recognize that the present invention is not meant to be limited to processing still images but is applicable to processing different data, such as audio data, scientific data, sensor data, video data, etc.

In a digital image processing system, digital image signals are formed by first dividing a two-dimensional image into a grid. Each picture element, or pixel, in the grid has associated therewith a number of visual characteristics, such as brightness and color. These characteristics are converted into numeric form. The digital image signal is then formed by assembling the numbers associated with each pixel in the image into a sequence which can be interpreted by a receiver of the digital image signal.

Signal and image processing frequently require converting the input data into transform coefficients for the purposes of analysis. Often only a quantized version of the coefficients is needed (e.g. JPEG/MPEG data compression or audio/voice compression). Many such applications need to be done fast in real time such as the generation of JPEG data for high speed printers.

Pressure is on the data signal processing industry to find the fastest method by which to most effectively and quickly perform the digital signal processing. As in the field of compression generally, research is highly active and competitive in the field of fast transform implementation. Researchers have made a wide variety of attempts to exploit the strengths of the hardware intended to implement the transforms by exploiting properties found in the transform and inverse transform.

One such technique is the ISO 10918-1 JPEG International Standard/ITU-T Recommendation T.81. The draft JPEG standard is reproduced in Pennebaker and Mitchell, *JPEG Still Image Data Compression Standard*, New York, Van Nostrand Reinhold, 1993, incorporated herein by reference. One image analysis method defined in the JPEG standard, as well as other emerging compression standards, is discrete cosine transform (DCT) coding. With DCT coding, images are decomposed using a forward DCT (FDCT) and reconstructed using an inverse DCT (IDCT). An excellent general reference on DCTs is Rao and Yip, *"Discrete Cosine Transform: Algorithms, Advantages and Application"*, New York, Academic Press, 1990, incorporated herein by reference. It will be assumed that those of ordinary skill in this art are familiar with the contents of the above-referenced books.

It is readily apparent that if still images present storage problems for computer users and others, motion picture storage problems are far more severe, because full-motion video may require up to 60 images for each second of displayed motion pictures. Therefore, motion picture compression techniques have been the subject of yet further development and standardization activity. Two important standards are ISO 11172 MPEG International Standard and ITU-T Recommendation H.261. Both of these standards rely in part on FDCT coding and IDCT decoding.

DCT is an example of a linear transform algorithm, and in such transforms it is common for floating point constants to be used in multiplication operations. However floating point multiplication operations are expensive in terms of processor computations, and consequently slow down the speed at which the transform executes. As a result in applications in which the speed of processing is important, such as in JPEG/MPEG compression, designers seek to replace these floating point multiplications with integer multiplication operations which are faster to execute. Current designs demonstrate three general approaches by which this is achieved:

"Development of Integer Cosine Transforms by the Principle of Dyadic Symmetry", Cham, W.-K, IEE Proceedings, Vol. 136, Pt. 1, No 4, August 1989 describes replacing the floating point multiplications with multiplications done in fixed precision, i.e. approximate the floating point constant with an integer.

"Multiplierless Approximation of Transforms with Adder Constraint", Chen, Ying-Jui, Soontorn Oraintara, Trac D. Tran, Kevin Amaratunga, Truong Q. Nguyen, IEEE Signal Processing Letters, Vol. 9, No. 11, November 2002, describes approximating the floating point constant multiplication or integer multiplication with a series of shift and add operations. In this approach, the goal is to implement the multiplication operation in terms of shift and add operations on the multiplicand.

U.S. Pat. No. 6,766,341—Fast transform using scaled terms, to IBM Corp. describes approximating the floating point constant by finding a ratio (i.e. an integer numerator and an integer denominator) in which the numerator represents the bit patterns to be used in shift/add operations (as in "Multiplierless Approximation of Transforms with Adder Constraint" above), and the denominator scales the final result to achieve the accuracy of the approximation. Note that in this case, the shifts and adds are done during transform processing, and the denominator (divide operation or multiplication by the inverse) is folded into the quantization step.

Further the strategy of factoring a transform into its sub-transforms is a known technique used to simplify the execution of a transform. For example, "Fast Multiplierless Approximations of the DCT With the Lifting Scheme", Jie Liang, Trac D. Tran, IEEE Transactions on Signal Processing Vol. 19, No. 12, December 2001, discloses considering a DCT in terms of sub-transforms and performing the sub-transforms in lifting steps.

Also "Fast Algorithms for the Discrete W Transform and for the Discrete Fourier Transform", Zhongde Wang, IEEE Transactions on Acoustics, Speech and Signal Processing, Vol. ASSP-32, No. 4, August 1994, considers factoring a transform into its sub-transforms. These sub-transforms are matrices which are used to reduce the computation required to produce a result.

However, the problem posed by replacing floating point operations with fast approximations, and factoring transform equations into sub-transforms, is actually a multi-criteria optimization problem. Criterion one is to find approximations and sub-transforms that are quick to execute. This criterion refers to the "cost" in terms of shifts and adds. The greater the number of shift and add operations, the greater the total cost to execute all of the operations. Criterion two (equal in import to criterion one) is to mitigate any error, in the final transform output, which result from the approximations. As demonstrated in the prior art, scientists and engineers use different approaches to finding fast transforms and good approximations, but in general, their approaches all use heuristics and sometimes, guesses, at what truly constitutes a good balance between speed and accuracy, and the result is algorithms in which accuracy is sacrificed in the pursuit of optimal cost.

Accordingly what is needed is a way of improving the approximations used when in or for performing fast transforms.

SUMMARY OF INVENTION

To overcome the limitations in the prior art described above, and to overcome other limitations that will become apparent upon reading and understanding the present specification, the present invention discloses factoring a transform equation into at least two sub-transforms and considering each sub-transform separately when selecting approximations to replace constants. For example, this enables the approximations of constants in one sub-transform to comprise an integer numerator for each constant and a common denominator, and the approximations of another sub-transform to comprise an integer numerator for each constant and a common denominator different from that of the other sub-transform. As a result the approximations can be more accurate in each sub-transform, thereby reducing error.

According to a first aspect the present invention provides a method comprising performing a selected transform equation having a plurality of sub-transform equations, using pre-selected integer values in place of the transform constants, to produce a result; and modifying at least one of the result of the transform equation and a comparison value to be compared with the result, using a pre-selected value, wherein each constant of a sub-transform approximates to a function of the pre-selected integer used in its place and a second value which is common to each transform constant in the sub-transform, and wherein the pre-selected value is a function of second values associated with each sub-transform.

According to a second aspect the present invention provides a data analyzing system comprising: a transformer which performs a selected transform equation having a plurality of sub-transform equations, using pre-selected integer values in place of the transform constants, to produce a result; and a modifier which modifies at least one of the result of the transform equation and a comparison value to be compared with the result, using a pre-selected value, wherein each constant of a sub-transform approximates to a function of the pre-selected integer used in its place and a second value which is common to each transform constant in the sub-transform, and wherein the pre-selected value is a function of second values associated with each sub-transform.

According to a third aspect the present invention provides an article of manufacture comprising a program storage medium readable by a computer, the medium tangibly embodying one or more programs of instructions executable by a computer to perform a method comprising: performing a selected transform equation having a plurality of sub-transform equations, using pre-selected integer values in place of the transform constants, to produce a result; and modifying at least one of the result of the transform equation and a comparison value to be compared with the result, using a pre-selected value, wherein each constant of a sub-transform approximates to a function of the pre-selected integer used in its place and a second value which is common to each transform constant in the sub-transform, and wherein the pre-selected value is a function of second values associated with each sub-transform.

According to a fourth aspect the present invention provides a method comprising: producing computer executable program code; providing the program code to be deployed to and executed on a computer system; the program code comprising instructions for: performing a selected transform equation having a plurality of sub-transform equations, using pre-selected integer values in place of the transform constants, to produce a result; and modifying at least one of the result of the transform equation and a comparison value to be compared with the result, using a pre-selected value, wherein each constant of a sub-transform approximates to a function of the pre-selected integer used in its place and a second value which is common to each transform constant in the sub-transform, and wherein the pre-selected value is a function of second values associated with each sub-transform.

Optionally the second values which are common to each sub-transform are different from each other. Preferably the second values are floating point values, alternatively they can be integers. Optionally in the approximations the integer is a numerator and the second value a denominator.

Preferably the pre-selected or third value is obtained by evaluating the function of the second values of each sub-transform and then converting the result of this evaluation to fixed precision. As a result the fixed precision value is then used in modifying the result or comparison value.

Preferably the result or the comparison value is modified as part of a quantization step.

According to a fifth aspect the present invention provides a method comprising: modifying input data for a selected transform equation comprising at least two sub-transforms using a pre-selected value, and performing the selected transform equation on the modified input data using pre-selected integer values in place of the transform constants, to produce a result, wherein each constant of a sub-transform approximates to a function of the pre-selected integer used in its place and a second value which is common to each transform constant in the sub-transform, and wherein the pre-selected value is a function of the second values for each sub-transform.

According to a sixth aspect the present invention provides a data analyzing system comprising: a modifier which modifies input data for a selected transform equation comprising at least two sub-transforms using a pre-selected value, and a transformer which performs the selected transform equation on the modified input data using pre-selected integer values in place of the transform constants, to produce a result, wherein each constant of a sub-transform approximates to a function of the pre-selected integer used in its place and a second value which is common to each transform constant in the sub-transform, and wherein the pre-selected value is a function of the second values for each sub-transform.

According to a seventh aspect the present invention provides an apparatus comprising: memory for storing image data; a processor for processing the image data to provide a compressed print stream output; and a printhead driving circuit for controlling a printhead to generate a printout of the image data; wherein the processor applies a pre-selected transform equation comprising at least two sub-transforms to the image data by: modifying the image data using a pre-selected value, and performing the selected transform equation on the modified image data using pre-selected integer values in place of the transform constants, to produce a result, wherein each constant of a sub-transform approximates to a function of the pre-selected integer used in its place and a second value which is common to each transform constant in the sub-transform, and wherein the pre-selected value is a function of the second values for each sub-transform.

According to a eighth aspect the present invention provides an article of manufacture comprising a program storage medium readable by a computer, the medium tangibly embodying one or more programs of instructions executable by a computer to perform a method comprising: modifying input data for a selected transform equation comprising at least two sub-transforms using a pre-selected value, and performing the selected transform equation on the modified input data using pre-selected integer values in place of the transform constants, to produce a result, wherein each constant of a sub-transform approximates to a function of the pre-selected integer used in its place and a second value which is common to each transform constant in the sub-transform, and wherein the pre-selected value is a function of the second values for each sub-transform.

According to a ninth aspect the present invention provides a method comprising: producing computer executable program code; providing the program code to be deployed to and executed on a computer system; the program code comprising instructions for: modifying input data for a selected transform equation comprising at least two sub-transforms using a pre-selected value, and performing the selected transform equation on the modified input data using pre-selected integer values in place of the transform constants, to produce a result, wherein each constant of a sub-transform approximates to a function of the pre-selected integer used in its place and a second value which is common to each transform constant in the sub-transform, and wherein the pre-selected value is a function of the second values for each sub-transform.

For example, the transform equation of the fifth to ninth aspects is an inverse of the transform equation of the first to fourth aspects.

Preferably the second values are floating point values, alternatively they can be integers. Optionally in the approximations the integer is a numerator and second value a denominator.

Preferably the pre-selected value or third value is obtained by evaluating the function of the second values of each sub-transform and then converting the result of this evaluation to fixed precision. As a result the fixed precision value is then used in modifying the input data.

Preferably the input data is modified as part of a de-quantization step.

Note that providing the program instruction code for deployment to a computer system can be achieved in many different ways. For example the program code could be provided for placement in storage which is accessible to a remote computer system and from which such computer systems can download the program code. For example the storage may be accessible from an internet site or an ftp (file transfer program) site. Alternatively the program code could be provided by transmission to the computer system over a computer network, for example as part of an e-mail or other network message transmission.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
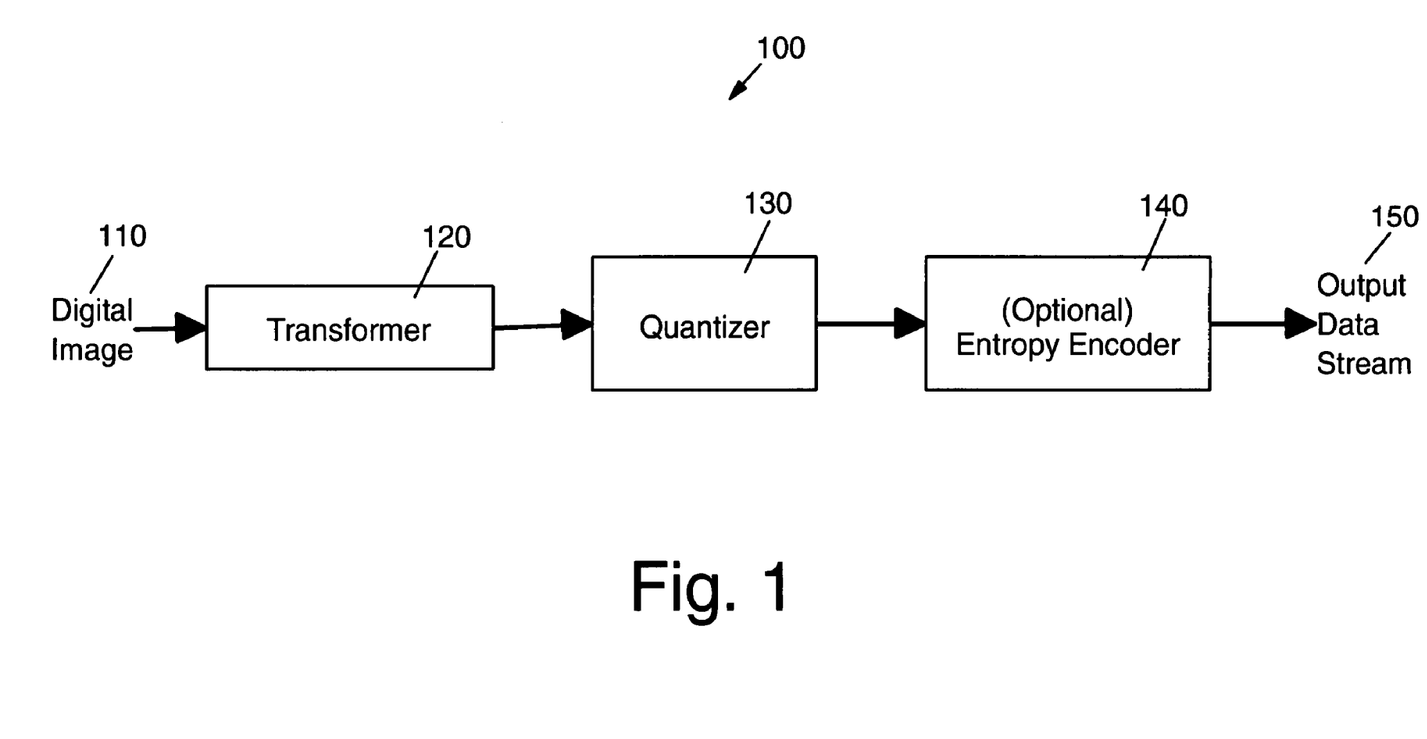
FIG. 1 is prior art image compression system 100 in which the present invention could be advantageously applied.

FIG. 1 illustrates a prior art image compression system 100 in which the present invention could be advantageously applied. The image compression system may include three closely connected components namely (a) Transformer 120, (b) Quantizer 130, and (c) Optional Entropy Encoder 140. Compression is accomplished by applying a transform to de-correlate the image data 110, quantizing the resulting transform coefficients, and, if desired, entropy coding the quantized values. A variety of linear transforms have been developed which include Discrete Fourier Transform (DFT), Discrete Cosine Transform (DCT), Discrete Wavelet Transform (DWT) and many more, each with its own advantages and disadvantages.

The quantizer 130 simply reduces the number of bits needed to store the transformed coefficients by reducing the precision of those values. Since this is a many-to-one mapping, it is a lossy process and is a significant source of compression in an encoder. Quantization can be performed on each individual coefficient, which is known as Scalar Quantization (SQ). Quantization can also be performed on a collection of coefficients together, and this is known as Vector Quantization (VQ). Both uniform and non-uniform quantizers can be used depending on the problem at hand.

The optional entropy encoder 140 further compresses the quantized values losslessly to give better overall compression. It uses a model to accurately determine the probabilities for each quantized value and produces an appropriate code based on these probabilities so that the resultant output code stream will be smaller than the input stream. The most commonly used entropy encoders are the Huffman encoder and the arithmetic encoder, although for applications requiring fast execution, simple run-length encoding (RLE) has proven very effective.

The term image transforms usually refers to a class of unitary matrices used for representing images. This means that images can be converted to an alternate representation using these matrices. These transforms form the basis of transform coding. Transform coding is a process in which the coefficients from a transform are coded for transmission.

Consider the signal f(x) which is a function mapping each integer from 0 ... n−1 into a complex number. An example is given by a line of a sampled or pixelated image, where the samples or pixels are equally spaced. An "orthogonal basis" for a collection of such f(x) is a set $\{b_y(x)\}_{y=0}^{n-1}$ of functions, where $$\sum_{x=0}^{n-1} b_y(x)b_z(x) = 0 \text{ for } y \neq z.$$

A "transform" of f(x), denoted F(y), is given by $$F(y) = \sum_{x=0}^{n-1} f(x)b_y(x).$$

Transforms of this type are used in many signal and image processing applications to extract information from the original signal f. One example of a transform is the discrete Fourier transform (DFT), where $b_y(x) = \exp(2\pi i x y/n)$. A related example is the discrete cosine transform (DCT), where $b_y(x) = \cos(2\pi x y/n)$. Another example is the wavelet transform, where $b_y(x)$ is a particular scaled and offset version of the mother wavelet function. (See: Ingrid Daubechies, *Ten Lectures on Wavelets*, Society for Industrial & Applied Mathematics, (May 1992)).

The theoretical basis for the independent scaling operations will now be demonstrated by showing the mathematical basis for being able to perform the scales without destroying the structure of the transform. Define a transform $$F(y) = \sum_{x=0}^{n-1} f(x)b_y(x).$$

Consider those cases (described below) when the $b_y(x)$ are such that this transform can be split into two or more disjoint sums, regardless of the structure of f(x). (The term "disjoint", when used herein in reference to the sets of equations, means that there are no transform coefficients in common between equations in the two disjoint sets of equations.) For example, if $b_{2y}(x)$ have even symmetry, and $b_{2y+1}(x)$ have odd symmetry, it is known from mathematics that any f(x) can be written uniquely as $f(x)=f_e(x)+f_o(x)$, where $f_e(x)$ is even (symmetric about zero) and $f_o(x)$ is odd (anti-symmetric about zero), and that $$\sum_x f_e(x)b_{2y-1}(x) = \sum_x f_o b_{2y}(x) = 0.$$

This enables the transform to be written equivalently as:

$$F(y) = \sum_{y=0}^{\lfloor (n-1)/2 \rfloor} f_e(x)b_{2y}(x) + \sum_{y=1}^{\lfloor n/2 \rfloor} f_o(x)b_{2y-1}(x)$$

An example of such a transform is a 1-D DCT which is used, for example, to decompose a set of 8 grayscale samples to their underlying spatial frequencies. Further a 1-D DCT can be extended to apply to 2-D images which require 8×8 arrays of sample blocks. This is because 2D sample blocks can be processed by multiplying a horizontally oriented set of 1-D DCT functions by a vertically oriented set of the same functions, such an arrangement being a 2-D DCT. However for the purposes of describing the preferred embodiment of the present invention a 1-D DCT will be used, and a skilled person will realize that this can be considered equivalent to processing the top row of 8×8 2-D image blocks, such as for a JPEG image.

In a 1-D DCT the set of eight samples are represented by 8 values s(x) for x=0 to 7, and each is transformed using a Forward DCT (FDCT) which comprises the following equations:

$$S(u) = (C(u)/2)\sum_{x=0}^{7} s(x)\cos[(2x+1)u\pi/16]$$

The transformed image is then reconstructed using an Inverse DCT (IDCT) which comprises the following equations:

$$s(x) = \sum_{u=0}^{7} (C(u)/2)S(u)\cos[(2x+1)u\pi/16]$$

In which:
u=0 to 7
$C(u)=1/\sqrt{2}$ for u=0
$C(u)=1$ for u>0
s(x)=value from image sample
S(u)=DCT coefficient for JPEG sample values However, if these equations were followed in full, the cost in terms of execution would be high because the mathematical executions are complex and many. As a result the equations are reduced to a more simple set, such a set being known as Fast DCT. One well known FAST DCT is the Vetterli and Ligtenberg fast 1-D DCT and this may be written as the following equations.

$$2S(0)=C_4[(s_{07}+s_{12})+(s_{34}+s_{56})]$$

$$2S(1)=C_1[d_{07}+C_4(s_{12}-s_{56})]-C_7[-d_{34}-C_4(d_{12}+d_{56})]$$

$$2S(2)=C_2(s_{07}-s_{34})+C_6(d_{12}-d_{56})$$

$$2S(3)=C_3[d_{07}-C_4(s_{12}-s_{56})]-C_5[d_{34}-C_4(d_{12}+d_{56})]$$

$$2S(4)=C_4[(s_{07}+s_{34})-(s_{12}+s_{56})]$$

$$2S(5)=C_5[d_{07}-C_4(s_{12}-s_{56})]+C_3[d_{34}-C_4(d_{12}+d_{56})]$$

$$2S(6)=C_6(s_{07}-s_{34})-C_2(d_{12}-d_{56})$$

$$2S(7)=C_7[d_{07}+C_4(s_{12}-s_{56})]+C_1[-d_{34}-C_4(d_{12}+d_{56})]$$

In which:

$C_n=\cos(n\pi/16)$ $S_{jk}=s(j)+s(k)$ $d_{jk}=s(j)-s(k)$

If this FAST FDCT were used in executing the transform equations, the inclusion of the floating point constants $C_n$ would result in many expensive floating point multiplications. Accordingly, in the prior art, these values are replaced with approximations which results in the floating point multiplication being replaced with integer multiplications.

For example in U.S. Pat. No. 6,766,341, the constants in a given equation are replaced with integer numerators and a common integer denominator, and in co-pending patent application BLD920040019 the constants are replaced with integer numerators and a common floating point denominator. Further, in this prior art common denominators are used for each equation because this enables the transform to be performed with the integer numerators only, and the denominators to be factored in at a later stage. For example, consider the following equation:

$$2S(1)=C_1[d_{07}+C_4(s_{12}-s_{56})]-C_7[-d_{34}-C_4(d_{12}+d_{56})]$$

If the floating point constants $C_1$ and $C_7$ are replaced with an integer numerators, $N_1$ and $N_7$, and common denominator y, the following equation results:

$$2S(1)=N_1[d_{07}+C_4(s_{12}-s_{56})]/y-N_7[-d_{34}-C_4(d_{12}+d_{56})]/y$$

This may be rewritten $$2*y*S(1)=N_1[d_{07}+C_4(s_{12}-s_{56})]-N_7[-d_{34}-C_4(d_{12}+d_{56})]$$

and as a result two floating point multiplications on the right side of the equation have been replaced with two integer multiplications.

Figure 2:
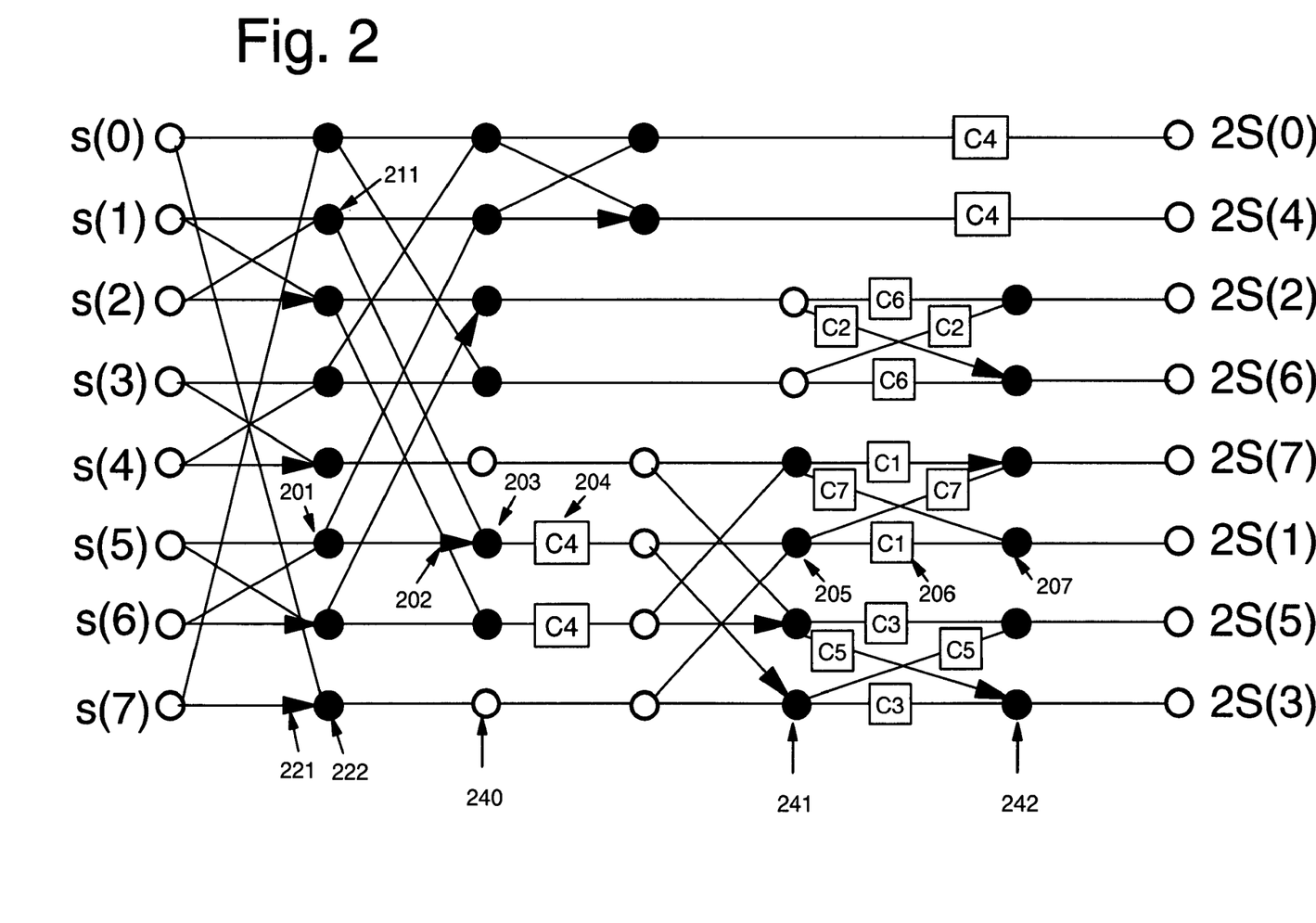
FIG. 2 is a flow-graph of the Vetterli and Ligtenberg fast 1-D DCT.

Another way of looking at the Vetterli and Ligtenberg fast 1-D DCT is with a flow-graph and one such flow-graph is shown in FIG. 2. In a flow-graph the logic flow is from left to right, a dark circle (e.g.: 201) represent an addition operation, an arrow (e.g.: 221) indicates negation of a value, and boxes (e.g.: 206) indicate a multiplication by the $C_n$ constant shown in the box.

For example, following the flow from s(5) to 2S(1), s(5) and s(6) are added at dark circle 201, and then negated by arrow 202. s(1) and s(2) are then added at dark circle 203 (these having been added at dark circle 211), and the result is multiplied by C4 at box 204. This gives $C_4(s_{12}-s_{56})$. At dark circle 205 s(0)–s(7) is added, s(7) having been negated at by arrow 221 and s(0) added at dark circle 222. This gives $d_{07}+C_4(s_{12}-s_{56})$, which is then multiplied by C1 at box 206 giving $C_1[d_{07}+C_4(s_{12}-s_{56})]$. Finally at dark circle 207, the sum $C_7[d_{34}+C_4(d_{12}+d_{56})]$ is added, and this may be derived by following the process described above but by following the line from s(4). Accordingly the equation that is produced for S(1) is:

$$2S(1)=C_7[d_{07}+C_4(s_{12}-s_{56})]+C_1[d_{34}+C_4(d_{12}+d_{56})]$$

which may be rewritten $$2S(1)=C_7[d_{07}+C_4(s_{12}-s_{56})]-C_1[-d_{34}-C_4(d_{12}+d_{56})]$$

This reproduces the equation for 2S(1) previously discussed.

Figure 3A:
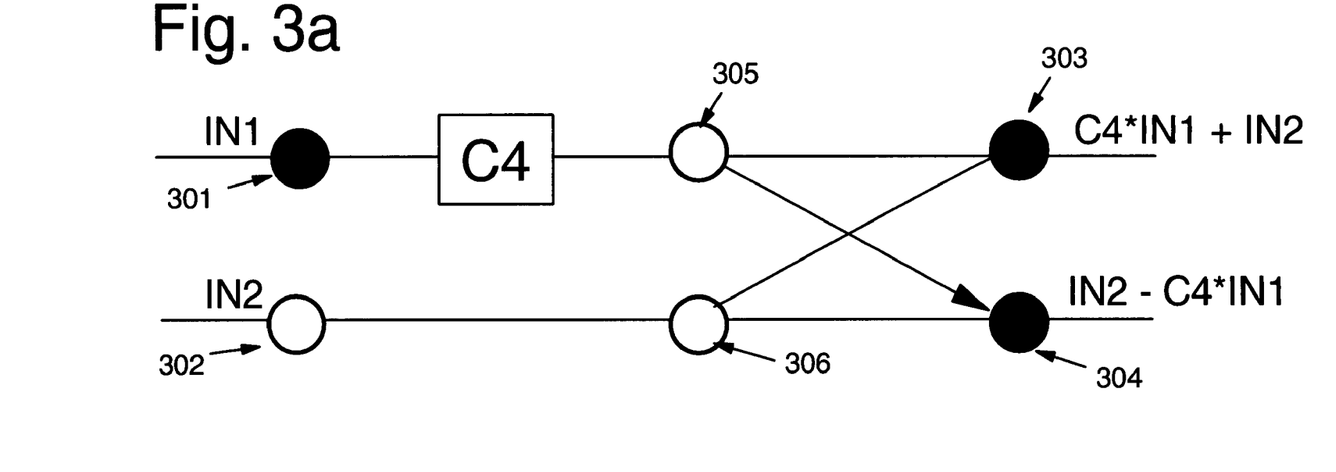
FIGS. 3a and 3b are flow-graphs of a C4 rotation.
Figure 4A:
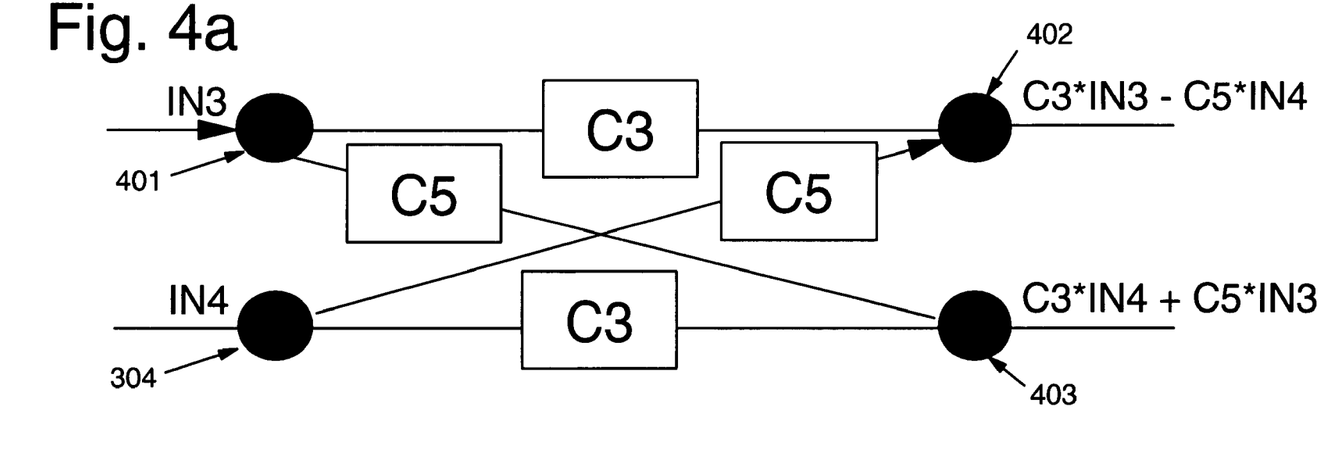
FIGS. 4a and 4b are flow-graphs of a C3/C5 rotation.

However, looking at the bottom four lines of the flowgraph the vertical column 241 of 4 dark circles indicate the point where two sub-transforms join and these are shown in FIGS. 3a, and 4a.

FIG. 3a shows the sub-transform which is known as the C4 rotation and can be seen in FIG. 2 between the columns 240 and 241 of circles, based on lines starting s(5) and s(7). However note that a similar pattern exists, but with a different negation, on lines starting s(4) and s(6), and a skilled person will realize that the teachings described with reference to FIGS. 3a and 3b also apply to this pattern.

From FIG. 3a it can be seen that if the inputs to nodes 301 and 302 are specified IN1 and IN2 respectively, then the results at nodes 303 and 304 would be (C4*IN1+IN2) and (IN2–C4*IN1), respectively.

Figure 3B:
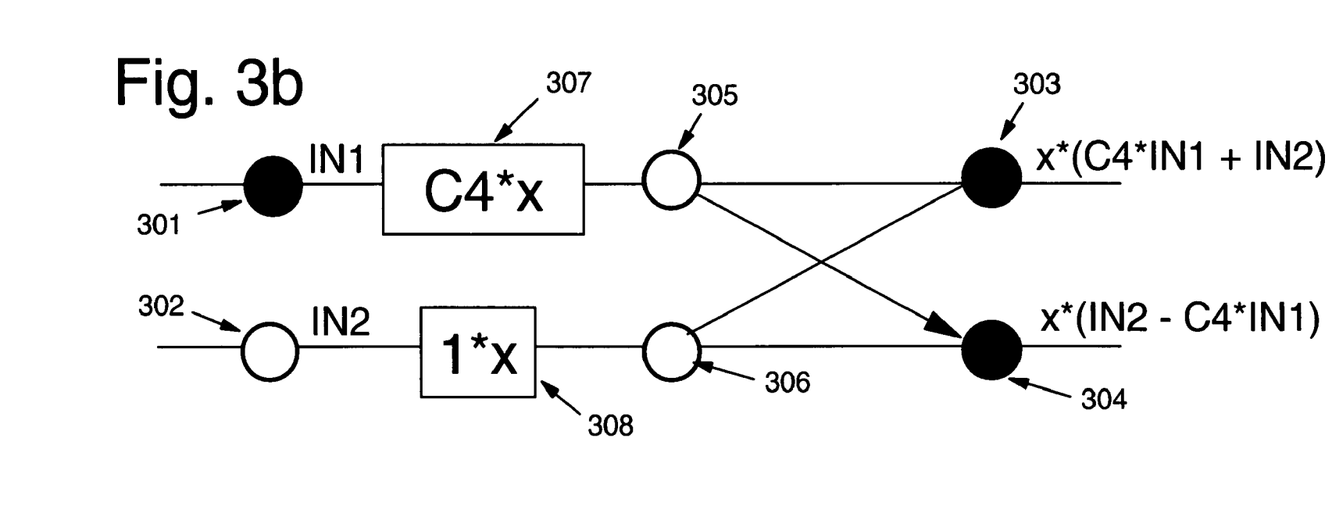

FIG. 3b shows the same transform but demonstrates that if the inputs are scaled by the same amount, for example between nodes 301,302 and 305,306, then the results at nodes 303 and 304 are also scaled by that amount. In the figure the scale factor is shown as an "x" factored into the C4 multiplication box 307 and newly added multiplication box 308. However note that in FIG. 3a a multiplication box could be added between nodes 302 and 306 with a multiplication value of 1 (which is equivalent to $C_0$). As a result of these changes the results at nodes 303 and 304 (i.e.: x*(C4*IN1+IN2) and x*(IN2–C4*IN1) have been multiplied by "x" and as a result if both results of the transform of FIGS. 3b were divided by "x" they would yield the same results as in FIG. 3a.

Further in FIG. 3b the scale factor "x" and/or its multiplication by C4 may yield a floating point number and as a result the values C4 and 1 in multiplier boxes 307, 308 may be replaced by approximations, for example by integer numerators divided by x, in which case the values shown in boxes 307 and 308 would be the integer numerators of the approximations.

FIG. 4a shows the sub-transform which is known as the C3/C5 rotation and can be seen in FIG. 2 between the columns 241 and 242 of circles, based on lines starting s(6) and s(7). However note that a similar pattern exists, but with a different negation, and using different constants on lines starting s(4) and s(5). This pattern is known as the C1/C7 rotation, and a skilled person will realize that the teachings described with reference to FIGS. 4a and 4b also apply to this pattern. Also note that the dark circle 304 in FIG. 4a is the same dark circle 304 in FIG. 3a.

From FIG. 4a it can be seen that if the inputs to nodes 401 and 304 are specified as IN3 and IN4 respectively, then the results at nodes 402 and 403 would be (C3*IN3−C5*IN4) and (C3*IN4+C5*IN3), respectively.

Figure 4B:
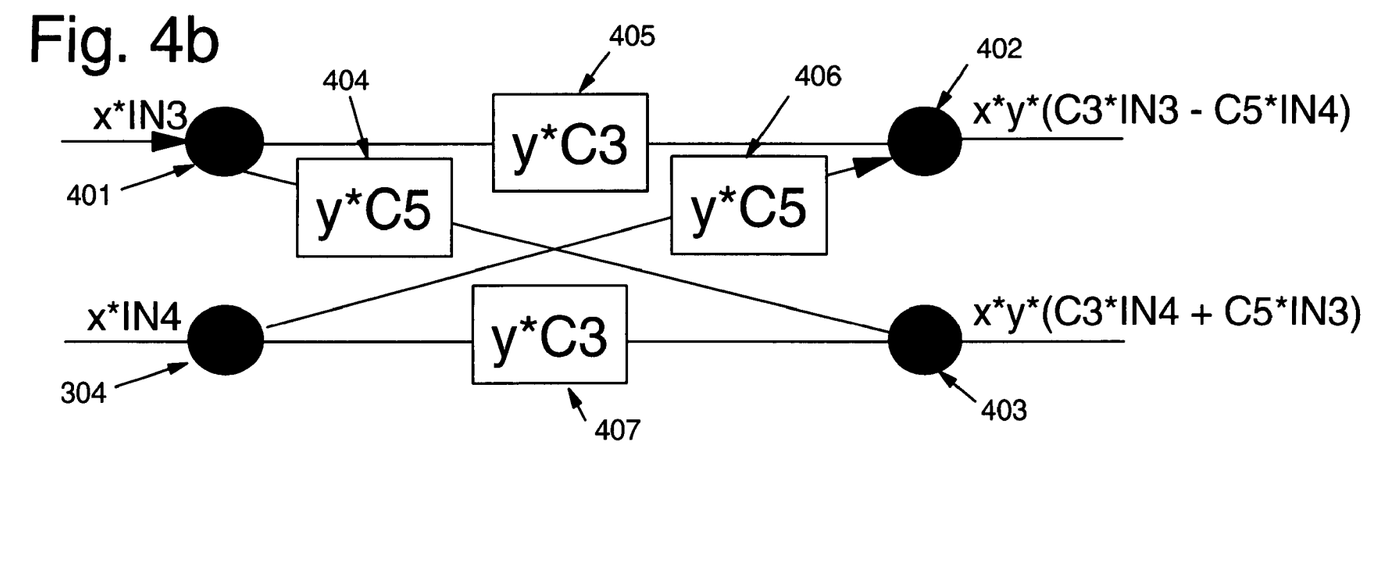

FIG. 4b shows the same transform but demonstrates that if the inputs have been scaled by a first amount on arrival at nodes 401 and 304, and then further scaled by a second amount in multipliers 404, 405, 406, and 407, then the results at nodes 402 and 403 are also scaled by the product of the first and second amounts. In the figure the first scale factor is shown as "x" and the second scale factor as "y". The second scale factor is factored into the C3 and C5 multiplication boxes 404, 405, 406, and 407. As a result of these changes the results at nodes 402 and 403 (i.e..: x*y*(C3*IN3−C5*IN4) and x*y*(C3*IN4+C5*IN13) have been multiplied by "x*y" and as a result if both results of the transform of FIGS. 3b were divided by "x*y" they would yield the same results as in FIG. 4a.

Further in FIG. 4b the scale factor "y" and its multiplication by C3/C5 may yield a floating point number and as a result the values C3 and C5 in boxes 404, 405, 406, and 407 may be replaced by approximations, for example by integer numerators divided by "y". In this case the values shown in boxes 404, 405, 406, and 407 would be the integer numerators of the approximations.

Figure 5:
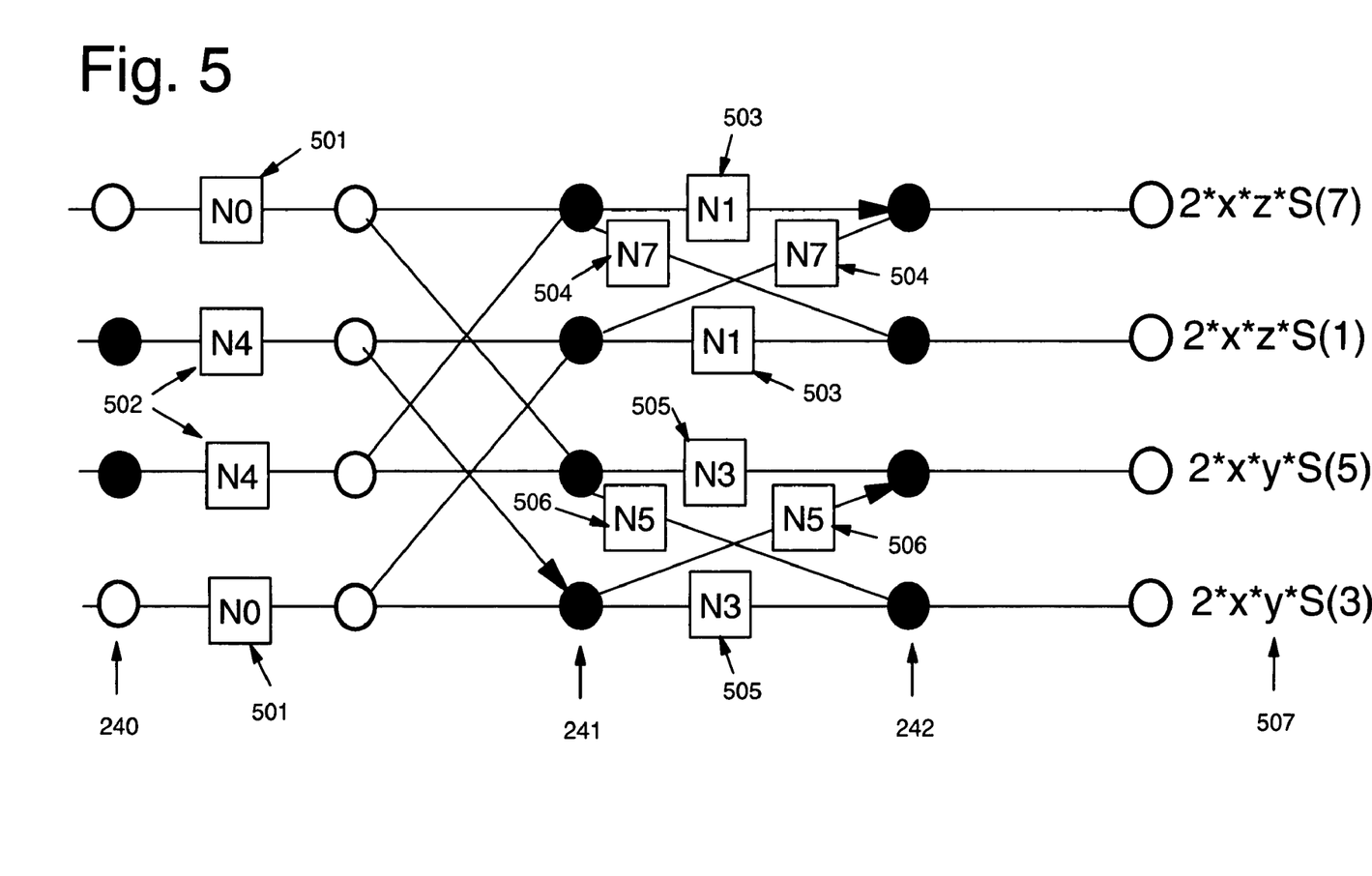
FIG. 5 is a section of the Vetterli and Ligtenberg fast 1-D DCT flow-graph according to the preferred embodiment of the present invention.

FIG. 5 shows the preferred embodiment of the present invention, based on the teachings described with reference to FIGS. 3b and 4b, as applied to the lower right section of the flow-graph shown in FIG. 2, and in particular the bottom 4 lines starting from the column 240 of circles. In FIG. 5 the constants have been replaced with approximations comprising an integer numerator and a denominator, where Nn is the numerator for Cn and N0 is the numerator for "1". Accordingly boxes 501 have been introduced to represent "1" and contain numerator N0 and boxes 502 which represent C4 contain numerator N4. The common denominator of these approximations is "x", where N0/x approximates to 1 and N4/x approximates to C4. However, because "x" is not included in boxes 501 and 502 and because N0 and N4 are involved on every flow line shown in the figure, "x" becomes a multiplier of the results 507 for S(7), S(1), S(5) and S(3). Further, boxes 503 which represent C1 contain numerator N1 and boxes 504 which represent C7 contain numerator N7. The common denominator of these approximations is "z", where N1/z approximates to C1 and N7/z approximates to C7. However because "z" is not included in boxes 503 and 504 and because N7 and N1 are involved in the flows of the top two lines, "z" becomes a multiplier in the results 507 for S(7) and S(1). The effect of these changes is that the results obtained from the top two flows must be divided by 2*x*z in order to obtain S(7) and S(1).

Further, boxes 505 which represent C3 contain numerator N3 and boxes 506 which represent C5 contain numerator N5. The common denominator of these approximations is y, where N3/y approximates to C3 and N5/y approximates to C5. However because it is not included in boxes 505 and 506 and because N3 and N5 are involved in the flows of the bottom two lines, "y" becomes a multiplier in the results 507 for S(5) and S(3). The effect of these changes is that the results obtained from the flow must be divided by 2*x*y in order to obtain S(5) and S(3).

Accordingly it has been shown that by identifying two separate transforms in each of the four flows shown in FIG. 5, the constants included in the flow have been approximated using two different denominators, whereas in the prior art a single denominator would be used. As a result of using two denominators the accuracy of the approximations can be increased and the errors in the final result decreased.

Splitting a flow into sub-transforms can also be shown in the equations for the flow graph. For example consider the equation:

$$2S(1)=C_7[d_{07}+C_4(s_{12}-s_{56})]-C_1[-d_{34}-C_4(d_{12}+d_{56})]$$

This may be rewritten as:

$$2S(1)=(N_7[N_0d_{07}+N_4(s_{12}-s_{56})]/x-N_1[-N_0d_{34}-N_4(d_{12}+d_{56})]/x)/y$$

Further, this may be re-written:

$$x*y*2S(1)=N_7[N_0d_{07}+N_4(s_{12}-s_{56})]-N_1[-N_0d_{34}-N_4(d_{12}+d_{56})]$$

where
$N_0/x$ approximates to 1
$N_1/y$ approximates to $C_1$
$N_4/x$ approximates to $C_4$
$N_7/y$ approximates to $C_7$ Accordingly this equation for S(1) can be said to comprise two sub-transforms because it is involved in both a C4 rotation and a C1/C7 rotation. Simialrly each of the equations for S(3), S(5) and S(7) also comprise two sub-transforms.

Figure 6:
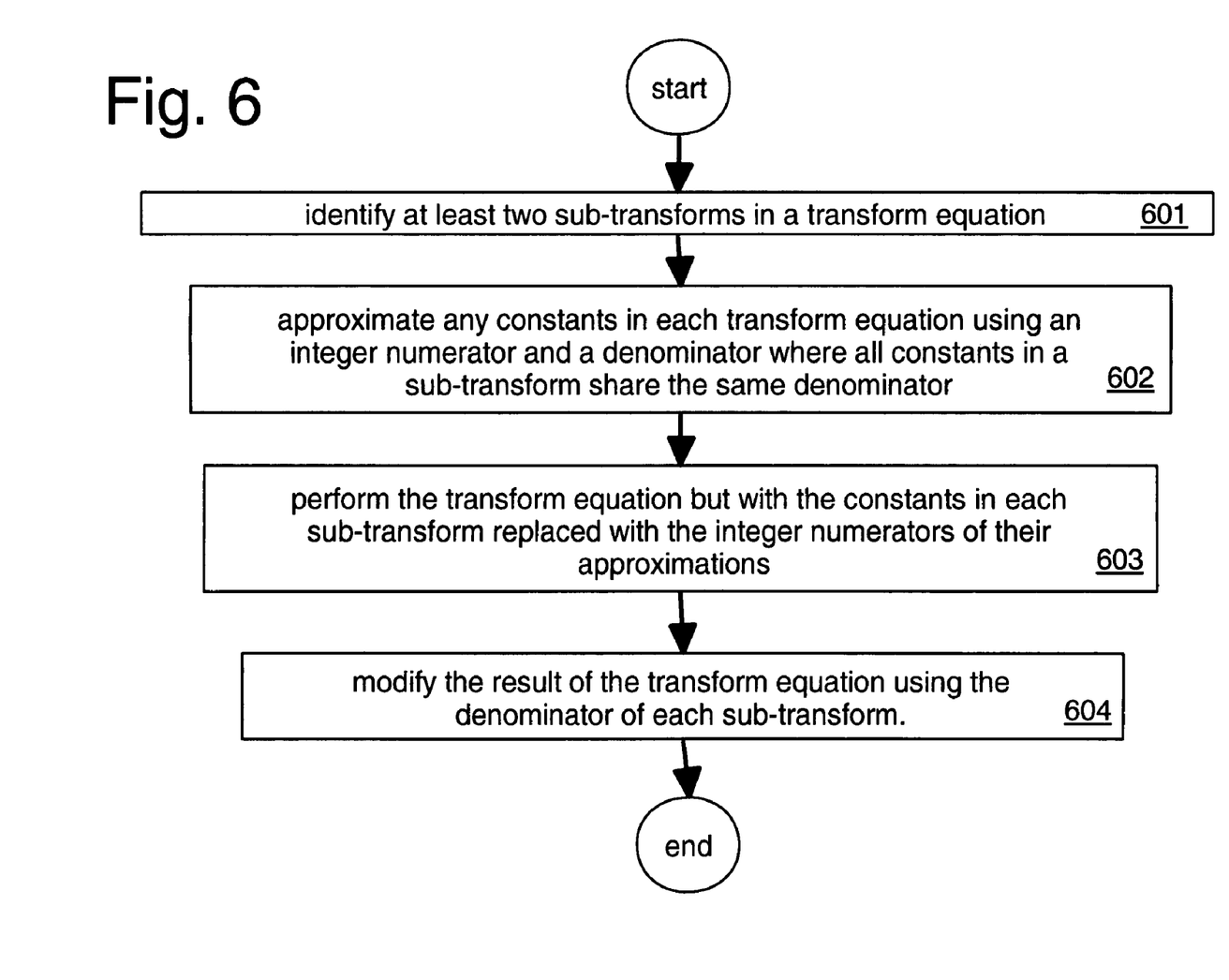
FIG. 6 is a flowchart of performing a transform equation comprising a plurality of sub-transforms according to the preferred embodiment of the present invention.

FIG. 6 is a flow chart of the preferred embodiment of the present invention. At step 601 at least two sub-transforms are identified in a transform equation. For example this could be a C4 rotation and a C3/C5 rotation as shown in FIGS. 3a and 4a in either the equation for S(3) or S(5). At step 602 the transform constants of each sub-transform in the equation are replaced by approximations and a constant may include a constant of 1 which is equivalent to $C_0$. Each sub-transform is considered separately at this stage and each approximation in a sub-transform comprises a numerator and a denominator, where the denominator is common to each approximation for the sub-transform. However there is no requirement of common denominators across sub-transforms. At step 603 the equation is performed, with the constants of each sub-transform replaced by the numerators of their approximations, to produce a result. As a result of not using the denominators of the approximations for each sub-transform when performing the equation at step 603, the result of the equation is modified at step 604 using these denominators. If the denominators are floating point values they may be converted to fixed precision before being used to modify the result, and further modification of the result can be performed as part of a quantization step.

Note that whilst FIG. 6 illustrates a method which is used, for example, to transform a JPEG image for storage and/or transmittal using a forward DCT, the present invention can equally be applied to reconstructing a transformed JPEG image, using an inverse DCT. In this case the product of the floating point values would be used to modify the input data to the transform, rather than the result of the transform and this would be performed before step 603. Further, in this case, optionally the input data could be modified as part of a dequantization step.

Further note that a skilled person will realize that steps 601 and 602 can be carried out at design time, and steps 603 and 604 at runtime, for a given implementation of the method. In this case in order to minimize processing at runtime a skilled person will also realize that any calculations which can be evaluated at design time should be done at this stage in preference to runtime. For example, if the result is modified using the product of the denominators for each sub-transform at step 604, this value of this product can be computed at design time and used at runtime.

Further note that whilst the embodiment has been described in terms of the sub-transforms in the Vetterli and Ligtenberg fast 1-D DCT, a skilled person will realize that the invention can also be applied to other DCTs. For example it can be noticed that an equation may contain sub-transforms if it involves multiplication of two constant values. Further, in terms of a flow-graph a sub-transform can be identified as a section of two or more flows which are joined only to each other and involve a transform constant on each flow, although this may include, for example $C_0$ which evaluates to 1. Accordingly a flow will contain two sub-transforms if it is involved in two such sections which are separated by a node such as circle shown in FIG. 2.

Further note that whilst the embodiment has been described in terms of a single 1-D fast DCT, a skilled person will realize that the invention could equally be applied to other 1-D fast DCTs and further 2-D fast DCTs. Similarly a skilled person will realize that the invention could also be applied to other transforms such as discrete Fourier transforms (DFT), and wavelet transforms.

Further note that whilst the preferred embodiment of the present invention has been discussed in terms of integer numerators and common denominators a skilled person will realize that it could equally be implemented, for example, with an integer numerator and common numerator. In this case the common numerator would be the inverse of the common denominator of the preferred embodiment of the present invention.

Note that a skilled person in the art will realize that the methods described with reference to FIG. 6 could be implemented in a variety of programming languages, for example, Java™, C, and C++ (Java is a registered trademark of Sun Microsystems, Inc. in the United States, other countries, or both). Further a skilled person will realize that once implemented the methods can be stored in a computer program product comprising one or more programs, in source or executable form, on a media, such as floppy disk, CD, and DVD, suitable for loading onto a data processing host and causing the data processing host to carry out the methods.

Figure 7:
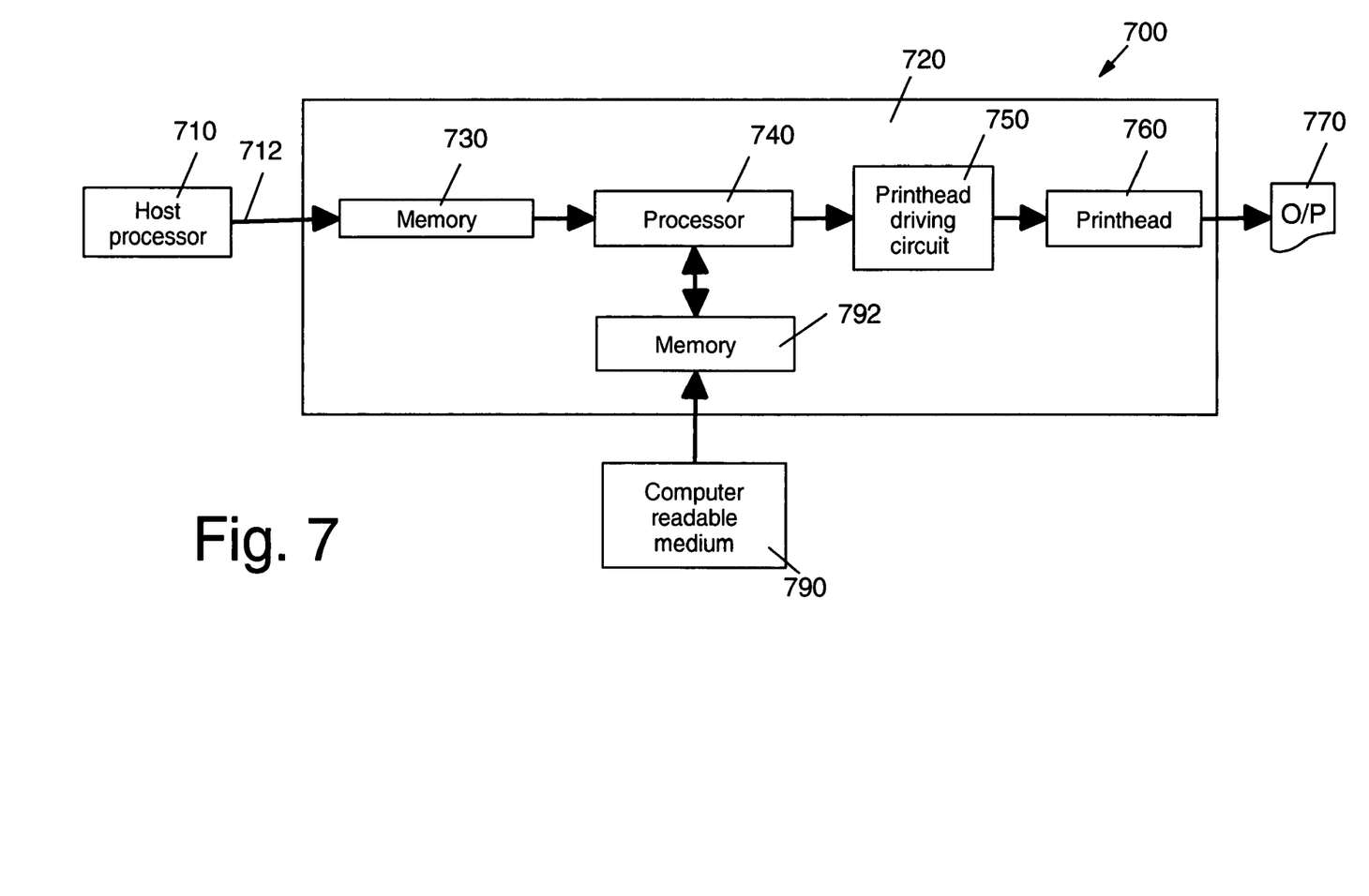
FIG. 7 is a block diagram of a printer according to the preferred embodiment of the present invention.

FIG. 7 illustrates a block diagram 700 of a printer 710 according to the present invention. In FIG. 7, the printer 720 receives image data 712 from a host processor 710. The image data 712 is provided into memory 730 where the image data may be arranged into 8×8 block samples. The 8×8 block samples are then processed by a processor 740, such as a raster image processor. The raster image processor 740 provides a compressed print stream representing the image data to a printhead driving circuit 750. The printhead driving circuit 450 then controls the printhead 760 to generate a printout 770 of the image data. Note that a skilled person will realize that the printhead driving circuits will include a decoder function for decoding the compressed print stream, thus allowing more pages to be stored ready for printing.

The process illustrated with reference to FIG. 6, but modified for an inverse DCT, may be tangibly embodied in a computer-readable medium/carrier 790, e.g. one or more of the fixed and/or removable data storage devices illustrated in FIG. 7, or other data storage or data communications devices. The computer program may be loaded into the memory 792 to configure the processor 740 of FIG. 7, for execution. The computer program comprises instructions which, when read and executed by the processor 740 of FIG. 7, causes the processor 740 to perform the steps necessary to execute the steps or elements of the present invention.

Figure 8:
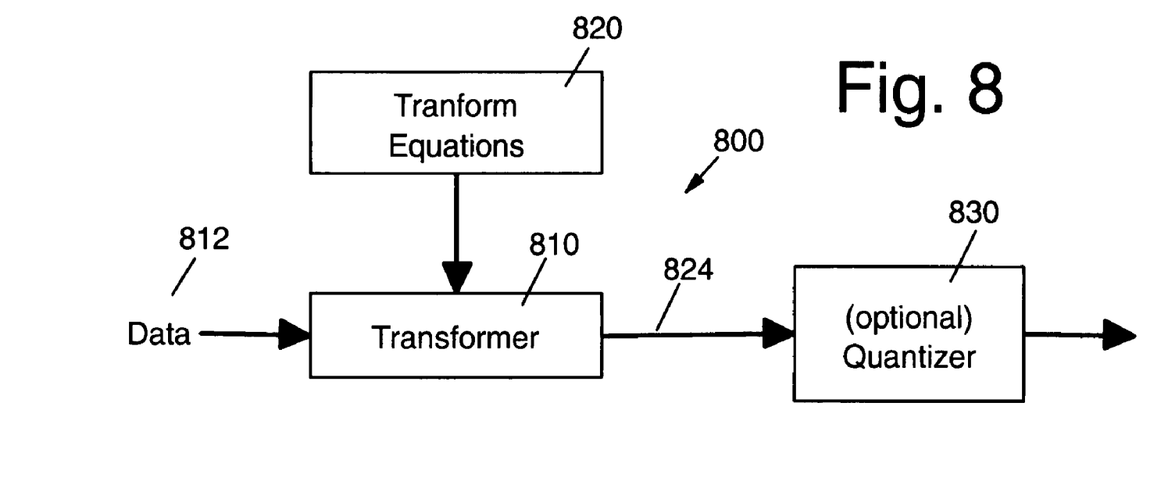
FIG. 8 is a block diagram of a first data analyzing system according to the preferred embodiment of the present invention.

FIG. 8 illustrates a data analyzing system 800 according to the present invention. In FIG. 8, a transformer 810 receives a block of data 812 to be analyzed. The transformer 810 uses transform equations 820 which contain sub-transforms and in which constants in the each sub-transform are replaced by approximations, in order to generate transformed data 824. The transformed data 824 is then quantized by quantizer 830, and as part of quantization the result is modified using denominators of the approximations.

Figure 9:
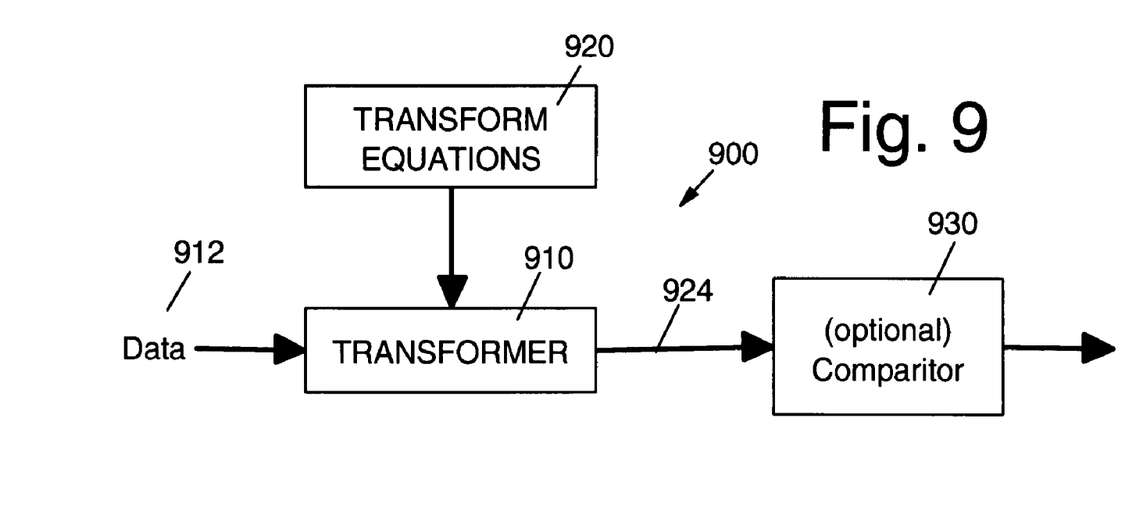
FIG. 9 is a block diagram of a second data analyzing system according to the preferred embodiment of the present invention.

FIG. 9 illustrates another data analyzing system 900 according to the present invention. In FIG. 9, a transformer 910 receives a block of data 912 to be analyzed. The transformer 910 uses transform equations 920 to generate transformed data 924. The transformer 910 uses transform equations 920 which contain sub-transforms and in which constants in each sub-transform are replaced by approximations, in order to generate transformed data 924 which is then modified using the denominators of the approximation. The transformed data 924 is then compared to comparison values in comparator 930, in which case modification of the transformed data using the denominators of the approximations may be deferred for performance by the comparator. Further a skilled person will realize that, the denominators of the approximations may be used to modify the comparison values instead of the transformed data.

In summary the present invention provides methods, apparatus and articles of manufacture for performing a transform equation in which at least two sub-transform equations can be identified. According to the invention, each sub-transform is considered separately and the constants of each sub-transform are replaced with an approximation which is a function of an integer value and a second value, where the second value is common to each constant in a sub-transform. The transform equation is then performed with the integer values in place of the constants. As a result either the input to the transform equation or at least one of the result of the transform and a value to be compared the result, is modified with a value which is a function of the second values for each sub-transform. By considering each sub-transform separately the second values of each sub-transform can be different thus allowing more accurate approximations to be used with minimal degradation in performance.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of reducing an error in a result of a transform equation, the method comprising:

identifying at least two sub-transforms in the transform equation;

approximating the constants in each of the at least two sub-transforms using denominators and integer numerators, wherein the denominators are different for each of the at least two sub-transform constants;

replacing the constants in each of the at least two sub-transforms with the integer numerators of the approximated constants to generate at least two modified sub-transforms;

generating the result by performing the transform equation using the at least two modified sub-transforms; and modifying the result using the denominator of each of the at least two sub-transforms to reduce the error.

2. The method of claim 1 wherein the denominators are floating point values.

3. The method of claim 2 wherein the denominators are fixed precision values.

4. The method of claim 1 wherein modifying the result is performed as part of a quantization step.

5. A method of reducing an error in a result of a transform equation, the method comprising:

modifying input data for the transform;

identifying at least two sub-transforms in the transform equation;

approximating the constants in each of the at least two sub-transforms using denominators and integer numerators, wherein the denominators are different for each of the at least two sub-transform constants;

replacing the constants in each of the at least two sub-transforms with the integer numerators of the approximated constants to generate at least two modified sub-transforms;

generating the result by performing the transform equation using the at least two modified sub-transforms; and modifying the result using the denominator of each of the at least two sub-transforms to reduce the error.

6. The method of claim 5 wherein the denominators are floating point values.

7. The method of claim 6 wherein the denominators are fixed precision values.

8. The method of claim 5 wherein modifying the result is part of a de-quantization step.

9. A data analyzing system comprising:

a transformer which performs a selected transform equation having a plurality of sub-transform equations, using pre-selected integer values in place of the transform constants, to produce a result; and a modifier which modifies at least one of the result of the transform equation and a comparison value to be compared with the result, using a pre-selected value, wherein each constant of a sub-transform approximates to a function of the pre-selected integer used in its place and a second value which is common to each transform constant in the sub-transform, and wherein the pre-selected value is a function of second values associated with each sub-transform.

10. The data analyzing system of claim 9 wherein the second values are floating point values.

11. The data analyzing system of claim 10 wherein the pre-selected value is a fixed precision approximation of a value obtained from the function of the second values.

12. A data analyzing system comprising:

a modifier which modifies input data for a selected transform equation comprising at least two sub-transforms using a pre-selected value, and a transformer which performs the selected transform equation on the modified input data using pre-selected integer values in place of the transform constants, to produce a result, wherein each constant of a sub-transform approximates to a function of the pre-selected integer used in its place and a second value which is common to each transform constant in the sub-transform, and wherein the pre-selected value is a function of the second values for each sub-transform.

13. The data analyzing system of claim 12 wherein the second values are floating point values.

14. The data analyzing system of claim 13 wherein the pre-selected value is a fixed precision approximation of a value obtained from the function of the second values.

15. An apparatus comprising:

memory for storing image data;

a processor for processing the image data to provide a compressed print stream output; and a printhead driving circuit for controlling a printhead to generate a printout of the image data;

wherein the processor applies a pre-selected transform equation comprising at least two sub-transforms to the image data by:

modifying the image using a pre-selected value, and performing the selected transform equation on the modified image data using pre-selected integer values in place of the transform constants, to produce a result, wherein each constant of a sub-transform approximates to a function of the pre-selected integer used in its place and a second value which is common to each transform constant in the sub-transform, and wherein the pre-selected value is a function of the second values for each sub-transform.

16. The apparatus of claim 15 wherein the second values are floating point values.

17. The apparatus of claim 16 wherein the pre-selected value is a fixed precision approximation of a value obtained from the function of the second values.

18. An article of manufacture comprising a program storage medium readable by a computer, the medium tangibly embodying one or more programs of instructions executable by a computer to perform a method of reducing an error in a result of a transform equation, the method comprising:

identifying at least two sub-transforms in the transform equation;

approximating the constants in each of the at least two sub-transforms using denominators and integer numerators, wherein the denominators are different for each of the at least two sub-transform constants;

replacing the constants in each of the at least two sub-transforms with the integer numerators of the approximated constants to generate at least two modified sub-transforms;

generating the result by performing the transform equation using the at least two modified sub-transforms; and modifying the result using the denominator of each of the at least two sub-transforms to reduce the error.

19. The article of manufacture of claim 18 wherein the denominators are floating point values.

20. The article of manufacture of claim 19 wherein the denominators are fixed precision values.

21. The article of manufacture of claim 18 wherein modifying the result is performed as part of a quantization step.

22. An article of manufacture comprising a program storage medium readable by a computer, the medium tangibly embodying one or more programs of instructions executable by a computer to perform a method to reduce an error in a result of a transform equation, the method comprising:

modifying input data for the transform;

identifying at least two sub-transforms in the transform equation;

approximating the constants in each of the at least two sub-transforms using denominators and integer numerators, wherein the denominators are different for each of the at least two sub-transform constants;

replacing the constants in each of the at least two sub-transforms with the integer numerators of the approximated constants to generate at least two modified sub-transforms;

generating the result by performing the transform equation using the at least two modified sub-transforms; and modifying the result using the denominator of each of the at least two sub-transforms to reduce the error.

23. The article of manufacture of claim 22 wherein the denominators are floating point values.

24. The article of manufacture of claim 23 wherein the denominators are fixed precision values.

25. The article of manufacture of claim 22 wherein modifying the result is part of a de-quantization step.

* * * * *